(12) United States Patent
Chickering et al.

(10) Patent No.: US 7,593,906 B2
(45) Date of Patent: Sep. 22, 2009

(54) BAYESIAN PROBABILITY ACCURACY IMPROVEMENTS FOR WEB TRAFFIC PREDICTIONS

(75) Inventors: David M. Chickering, Bellevue, WA (US); Ashis K. Roy, Kirkland, WA (US); Prasanth Pulavarthi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 11/461,030

(22) Filed: Jul. 31, 2006

(65) Prior Publication Data

US 2008/0027890 A1  Jan. 31, 2008

(51) Int. Cl.
*G06N 7/00* (2006.01)

(52) U.S. Cl. ............... 706/21; 706/12; 706/16; 706/18; 706/20; 706/45; 715/210; 715/701; 715/738; 715/739; 705/14

(58) Field of Classification Search .......... 706/12, 706/16–21, 45, 52, 55, 61; 715/210, 234, 715/701, 702, 738, 739; 705/14
See application file for complete search history.

(56) References Cited

U.S. PATENT DOCUMENTS

| | | | | |
|---|---|---|---|---|
| 5,704,017 A * | 12/1997 | Heckerman et al. | ............ | 706/12 |
| 6,278,966 B1 * | 8/2001 | Howard et al. | ................ | 703/23 |
| 6,345,265 B1 * | 2/2002 | Thiesson et al. | .............. | 706/52 |
| 6,807,537 B1 * | 10/2004 | Thiesson et al. | .............. | 706/52 |
| 6,907,566 B1 * | 6/2005 | McElfresh et al. | .......... | 715/210 |
| 6,925,452 B1 * | 8/2005 | Hellerstein et al. | ........... | 706/16 |
| 7,299,215 B2 * | 11/2007 | Drescher et al. | .............. | 706/45 |
| 2003/0208754 A1 * | 11/2003 | Sridhar et al. | ................. | 725/34 |
| 2003/0212851 A1 * | 11/2003 | Drescher et al. | ........... | 711/100 |
| 2004/0054572 A1 * | 3/2004 | Oldale et al. | .................. | 705/10 |
| 2004/0254903 A1 * | 12/2004 | Heckerman et al. | .......... | 706/46 |
| 2006/0168006 A1 * | 7/2006 | Shannon et al. | ............ | 709/206 |
| 2006/0282298 A1 * | 12/2006 | Azvine et al. | .................. | 705/8 |
| 2007/0061229 A1 * | 3/2007 | Ramer et al. | ................. | 705/35 |
| 2007/0061328 A1 * | 3/2007 | Ramer et al. | ................. | 707/10 |
| 2007/0061363 A1 * | 3/2007 | Ramer et al. | ............ | 707/104.1 |

* cited by examiner

*Primary Examiner*—David R Vincent
*Assistant Examiner*—Omar F Fernandez Rivas
(74) *Attorney, Agent, or Firm*—Lee & Hayes, PLLC

(57) ABSTRACT

Enhancements to Bayesian prediction models for network location traffic provide increased accuracy in web traffic predictions. The enhancements include implementing user advertising target queries to determine preferred edges of a Bayesian model, employing hierarchical data structures to cleanse training data for a Bayesian model, and/or augmenting existing data with new training data to enhance a previously constructed Bayesian model. Preferred edge enhancements for the Bayesian model utilize target attribute derived preferred edges and/or explicitly specified preferred edges. Training data is cleansed utilizing tag hierarchies that can employ parent-child relationships, ancestor relationships, and/or network location specific parameters. New training data can also be employed to adjust probabilities in a previously constructed Bayesian model. The new training data can be weighted differently than data represented by the previously constructed Bayesian model.

19 Claims, 9 Drawing Sheets

US 7,593,906 B2

BAYESIAN PROBABILITY ACCURACY IMPROVEMENTS FOR WEB TRAFFIC PREDICTIONS

BACKGROUND

Advertisers on the web are often interested in targeting impressions shown to users with certain targetable properties such as demographic or location information. For example, a particular advertiser might be most interested in showing an advertisement to males in the Seattle area who are older than 21. For some web sites, the properties for a particular user are often known due to that user having registered with the website in return for specialized services. When the user returns to a site for which they have registered, they may go through an explicit sign-in process, or they may be recognized by the site due to a cookie being placed on their machine.

Having targetable user properties makes a website particularly attractive for advertisers. If the website is going to sell impressions based on these properties, however, the site must be able to predict the composition of those properties among its visitors. For example, if the website expects to get 100 impressions in the next day, and if 50% of those impressions are shown to males, the website can only sell 50 male-targeted advertisements. There are many well-studied algorithms that can be applied to predict the total number of impressions to a website.

Some types of algorithms utilize Bayesian networks to model and predict what percentage of traffic at a given network location meets certain targeting criteria. The training data for these models comes from user requests that are sampled. Models are built periodically using the advertisement requests sampled during that time period. The Bayesian model building process uses the data to determine the relationships represented in the model. Accuracy of the predictions is important because the under-predictions lead to lost opportunity (the business actually had inventory but did not sell it) and over-predictions lead to under-delivery (the business did not have enough inventory to meet the commitments it made to advertisers which reduces customer satisfaction, and the business has to issue refunds or do make goods).

SUMMARY

Enhancements to Bayesian prediction models for network location traffic are leveraged to provide increased accuracy in traffic predictions. The enhancements include implementing user advertisement target queries to determine preferred edges of a Bayesian model, employing hierarchical data structures to cleanse training data for a Bayesian model, and/or augmenting data with new training data to enhance a previously constructed Bayesian model. Preferred edge enhancements for a Bayesian prediction model utilize target attribute derived preferred edges and/or explicitly specified preferred edges. Training data is cleansed utilizing tag hierarchies that can employ parent-child relationships, ancestor relationships, and/or network location specific parameters. This improves the training data accuracy, yielding better traffic predictions by a Bayesian model. New training data can also be employed to adjust probabilities in a previously constructed Bayesian model. The new training data can also be weighted differently than data represented by the previously constructed Bayesian model. These enhancements substantially improve the web traffic prediction accuracies of Bayesian models. Accurate predictions typically yield increased revenues for advertising based websites.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
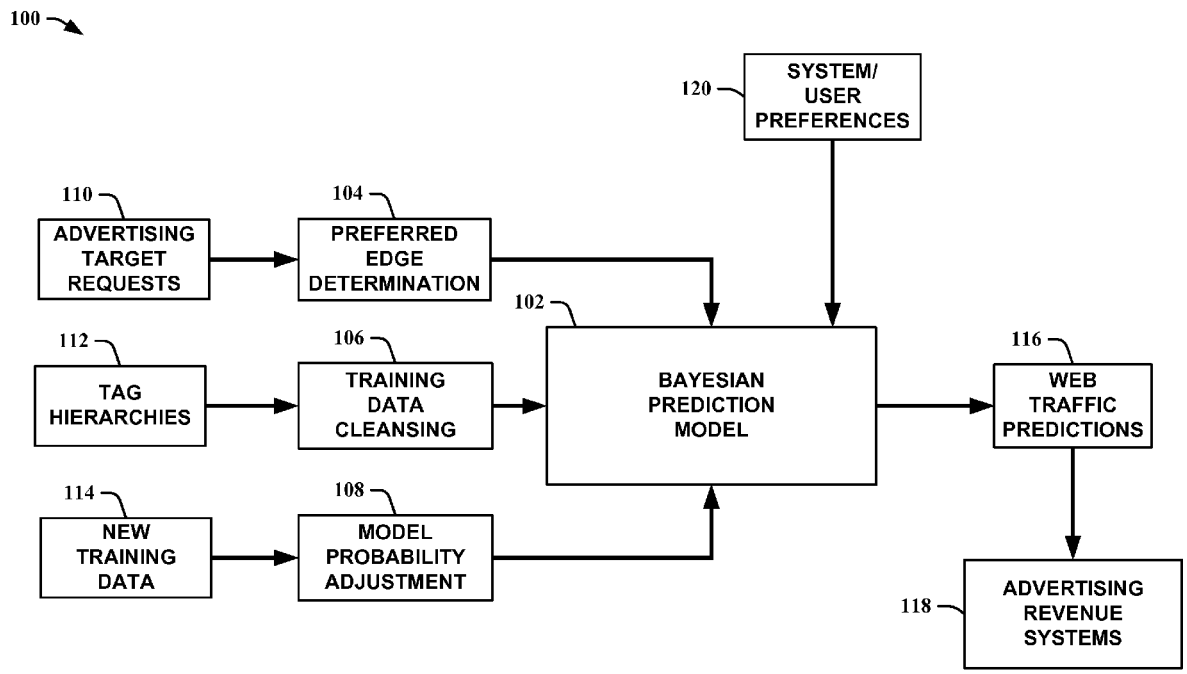
FIG. 1 is a block diagram of a web traffic prediction system employing Bayesian probability enhancement methods in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Web traffic statistics are extremely valuable for generating advertisement revenue. Most advertisement pricing is based on a prediction of what these statistics will be sometime in the future. Potential advertisers usually look for specific demographic information related to the web traffic before purchasing advertising space. This helps them in selecting an appropriate audience for their advertising products. Traditionally, prior data associated with web traffic is employed as training data to train a Bayesian model to facilitate in predicting future web traffic data. The accuracy of these predictions is paramount to maximizing advertising revenue. Thus, the instances provided herein facilitate in substantially increasing the probability accuracy of these Bayesian models employed to predict web traffic, increasing advertising revenue.

There are three factors that are the largest sources of inaccuracy in Bayesian prediction models. The first is training data that contains user-supplied information that may not be logically consistent (for example, a location of Seattle, Oreg.). This leads to the model containing relationships that are nonsensical and dilute the accuracy of other valid relationships. Second, the training data may present relationships (e.g., such as between connection speed and age) that are mathematically stronger than relationships that are known to exist and are more interesting (such as between age and gender). This leads to the Bayesian prediction model not providing the most accurate probabilities for targets containing common combinations. Third, a particular week's training data may have variations that are not reflective of the data over a longer period of time. Models built with this data, thus, may not predict future weeks accurately. The instances herein provide methods that substantially reduce the effect of these three factors and produce superior accuracy than with traditional modeling techniques. These methods improve accuracy by cleaning the data used to build the models, tuning the models to better answer the queries that users will likely ask, and augmenting existing models with more data.

In FIG. 1, a block diagram of a web traffic prediction system 100 employing Bayesian probability enhancement methods in accordance with an aspect of an embodiment is shown. The web traffic prediction system 100 is comprised of a Bayesian prediction model 102 that employs methods 104-108 to facilitate providing web traffic predictions 116. The methods 104-108 include a preferred edge determination 104 that utilizes advertising target requests 110, a training data cleansing 106 that incorporates tag hierarchies 112 associated with attributes of advertising target requests, and a model probability adjustment 108 that employs new training data 114. These methods 104-108 increase the accuracy of the Bayesian probabilities. Thus, the web traffic predictions 116 more accurately represent future web traffic statistics for a given network location such as, for example, a website. With accurate predictions, advertising revenue systems 118 can maximize their advertising revenue. The accurate predictions allow the advertising revenue systems 118 to charge appropriately for the types of web traffic encountered on a particular network location.

The preferred edge determination 104 represents a method that utilizes advertising target requests 110 to derive preferred edges for the Bayesian prediction model 102. The advertising target requests 110 typically have attribute pairs that can be extracted and analyzed to create preferred edges that are not necessarily mathematically significant otherwise. Additionally, system/user preferences 120 can be incorporated into preferred edge creation as well. The training data cleansing 106 represents a method that employs tag hierarchies 112 to cleanse training data of illogical combinations. The tag hierarchies 112 can include, for example, country-state-city hierarchies and the like. Thus, for example, cities that are not within a state can be precluded from the training data, increasing the accuracy of the Bayesian prediction model 102. In other scenarios, a product might only be sold in a specific market and for only a subset of the total targeting attributes available. In these cases, the models for those products can be constructed by excluding some of the non-applicable targeting attributes. The model probability adjustment 108 represents a method that utilizes new training data 114 to augment probabilities of the existing Bayesian prediction model 102. This provides increased probability accuracies without requiring construction of a new Bayesian model whenever additional new data is obtained, increasing efficiency as well. These methods 104-108 are discussed in detail infra.

In view of the exemplary system shown and described above, methodologies that may be implemented in accordance with the embodiments will be better appreciated with reference to the flow charts of FIGS. 2-7. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

For discussion purposes, a target is a set of conditions including a network location. A network location is an ad (advertisement) placement location (e.g., a website's right-side banner in a message reading view). The network location in a target can also represent multiple advertisement placements that, for example, happen to be treated as the same from a sales perspective. For example, right side banners on all web pages of a web domain can be sold as one placement even though they reside on multiple website pages. A condition is a comparison of a tag with a tag value (e.g. STATE=WA). A tag is an attribute of an ad request or user (e.g., STATE is the tag in the condition STATE=WA). A tag value is a value of a tag (e.g. WA is the tag value in the condition STATE=WA).

Figure 2:
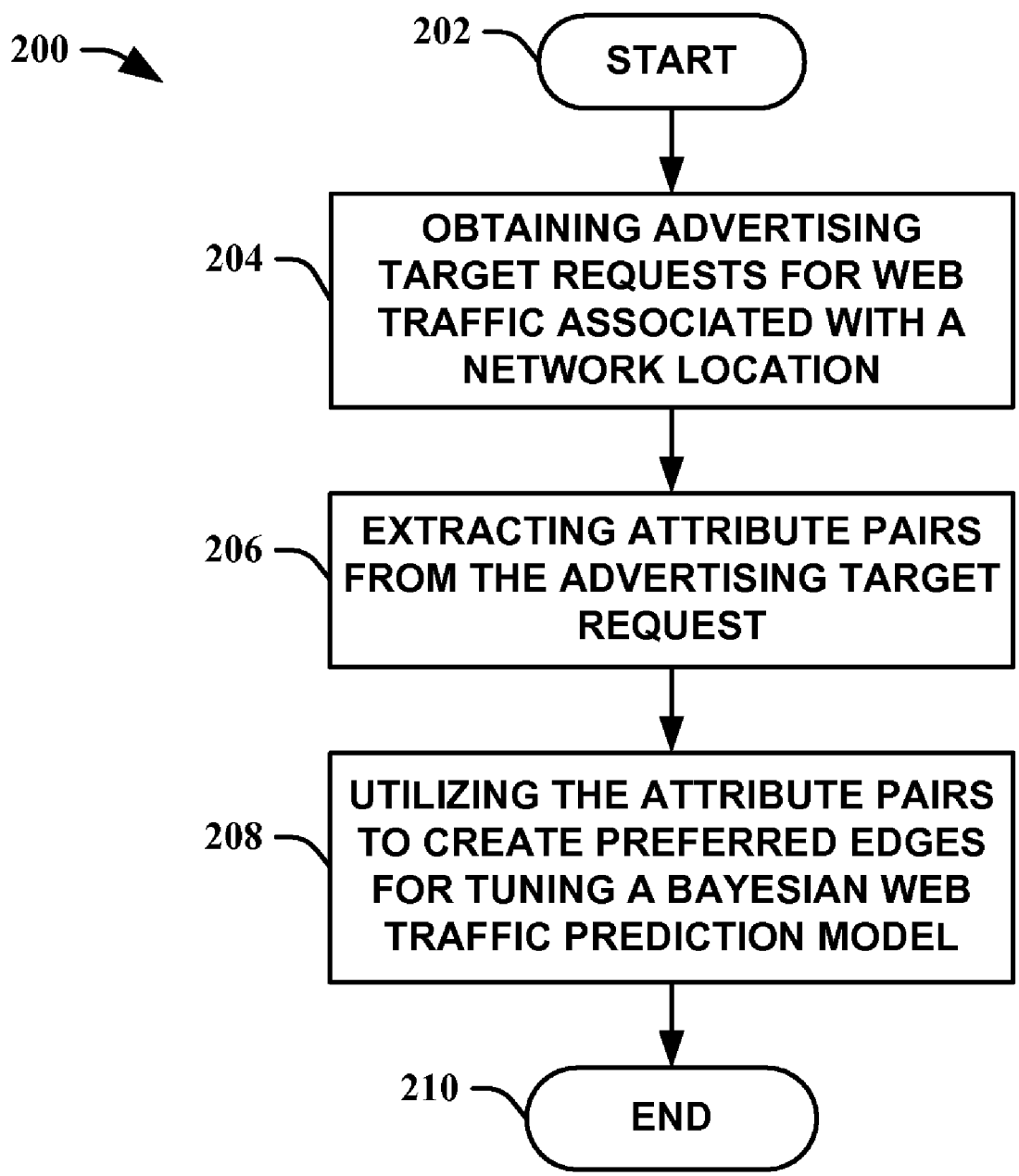
FIG. 2 is a flow diagram of a method of creating preferred edges for a Bayesian web traffic prediction model in accordance with an aspect of an embodiment.

In FIG. 2, a flow diagram of a method 200 of creating preferred edges for a Bayesian web traffic prediction model in accordance with an aspect of an embodiment is depicted. Previous advertising target queries or requests are used to bias a learning algorithm to prefer tag dependencies found in the queries. This allows observed data to be utilized to build a model over the joint distribution of tags associated with advertising target requests. Strong statistical dependencies between two tags are represented by a preferred edge which is incorporated into the joint distribution. The method 200 starts 202 by obtaining advertising target requests for web traffic associated with a network location 204. Attribute pairs are then extracted from the advertising target request 206. The preferred edges for a model are determined by the combinations of tags in each of the requested targets as well as any additional preferred edges that are explicitly specified. Only combinations of tags within each requested target are used; tags are not combined across requested targets. The preferred edges are also not directional. For example, TAG1~TAG2 and TAG2~TAG1 are equivalent. The attribute pairs are then utilized to create preferred edges for tuning a Bayesian web traffic prediction model 208, ending the flow 210.

Preferred edges tell a Bayesian model building process which relationships to optimize around even if they may not be mathematically strong. Instead of letting the training data entirely dictate the relationships in the models, commonly requested targets are utilized to help tune Bayesian models so that they provide accurate results for the combinations of targeting criteria that users are most interested in. This is in sharp contrast to traditional methods that typically add weaker edges to an existing model after the mathematically strong edges have been added. Simply adding additional edges quickly bloats the model before most of the interesting edges can be included. By employing the method 200, models can be constructed that answer the most asked questions concerning advertising targets, even though they are not mathematically significant.

For example, statistics for website traffic of a particular network location may imply a relatively weak dependence between gender and age. However, advertisers may deem that males under age 30 are their target audience and query a provider frequently for that particular advertising target. Thus, the advertising target queries can be used to find that a preferred edge is gender (e.g., males) and age (e.g., under 30). This edge can then be incorporated into the Bayesian model to find predictions specifically for gender and age. This allows advertising target queries to influence the Bayesian model rather than only data statistics based on network location traffic. Dependencies that can be used to sell advertising space are now available from the model, allowing substantial increases in advertiser satisfaction and revenue.

Figure 3:
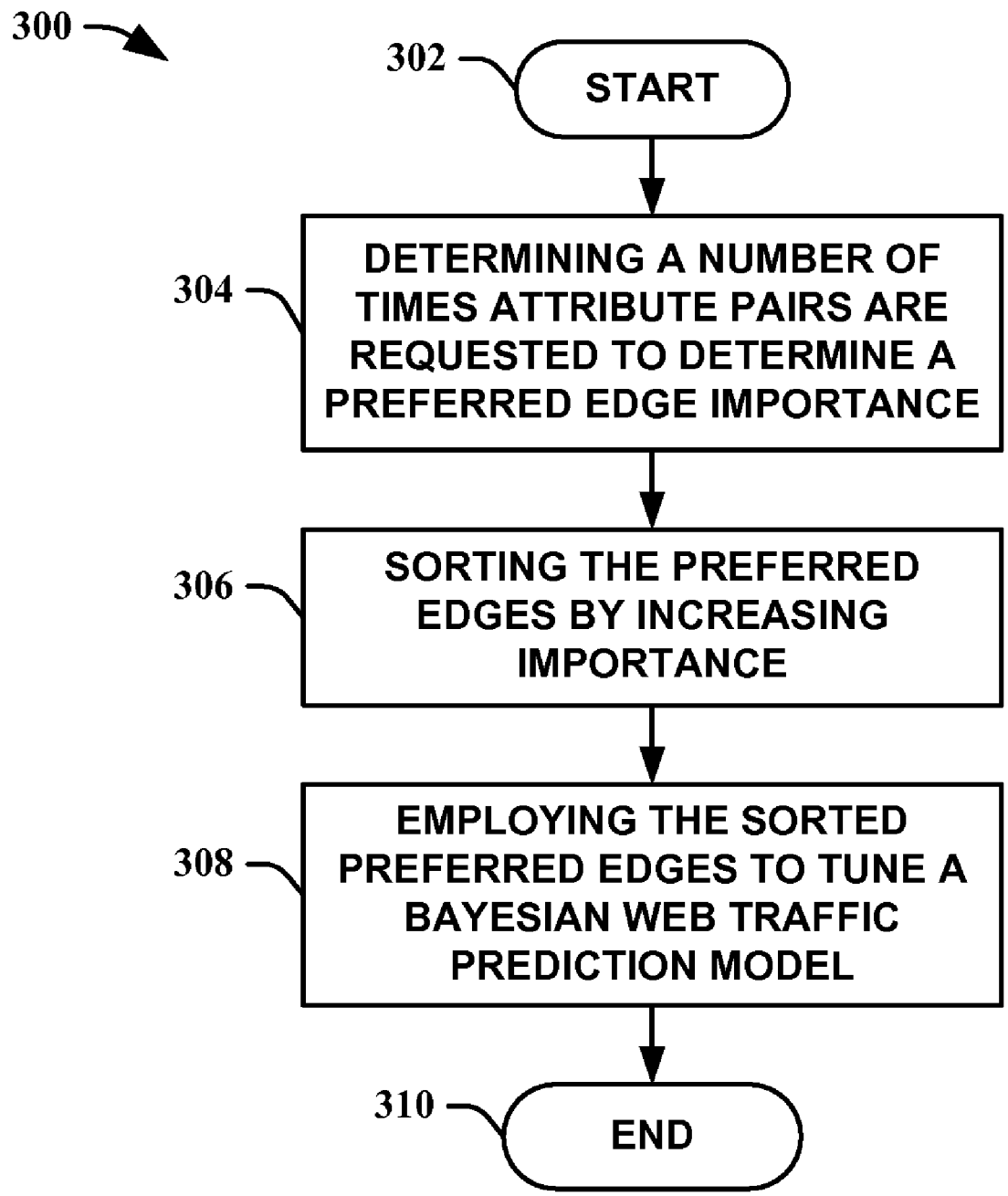
FIG. 3 is a flow diagram of a method of sorting preferred edges for a Bayesian web traffic prediction model in accordance with an aspect of an embodiment.

Looking at FIG. 3, a flow diagram of a method 300 of sorting preferred edges for a Bayesian web traffic prediction model in accordance with an aspect of an embodiment is illustrated. The method 300 starts 302 by determining a number of times attribute pairs are requested to determine a preferred edge importance 304. The preferred edges are then sorted by increasing importance 306. The sorted preferred edges are then employed to tune a Bayesian web traffic prediction model 308, ending the flow 310. For example, if the following targets were requested for the model as shown in TABLE 1:

TABLE 1

Target Request Example

| Target | Request Count |
|---|---|
| GENDER = F~AGE = P | 1 |
| GENDER = M~AGE = P~COUNTRY = US | 1 |
| AGE = P~COUNTRY = US~DMA = 501 | 1 |

The data is then sorted in descending order as shown in TABLE 2. Some of the most commonly occurring pairs are then utilized to build a preferred edge list for the model.

TABLE 2

Preferred Edge List Example

| Edge | Number of Requested Targets with This Edge |
|---|---|
| AGE~DMA | 1 |
| COUNTRY~DMA | 1 |
| GENDER~COUNTRY | 1 |
| AGE~COUNTRY | 2 |
| GENDER~AGE | 2 |

Additionally, weighting factors can be included in the sorting criteria. This allows certain parameters to be biased based on a weighting factor. For example, a value of "k" can be utilized to boost a preferred edge's importance and then greedily add them to a model. In other instances, the preferred edges do not employ weighting factors and are added to the model before incorporating data.

Figure 4:
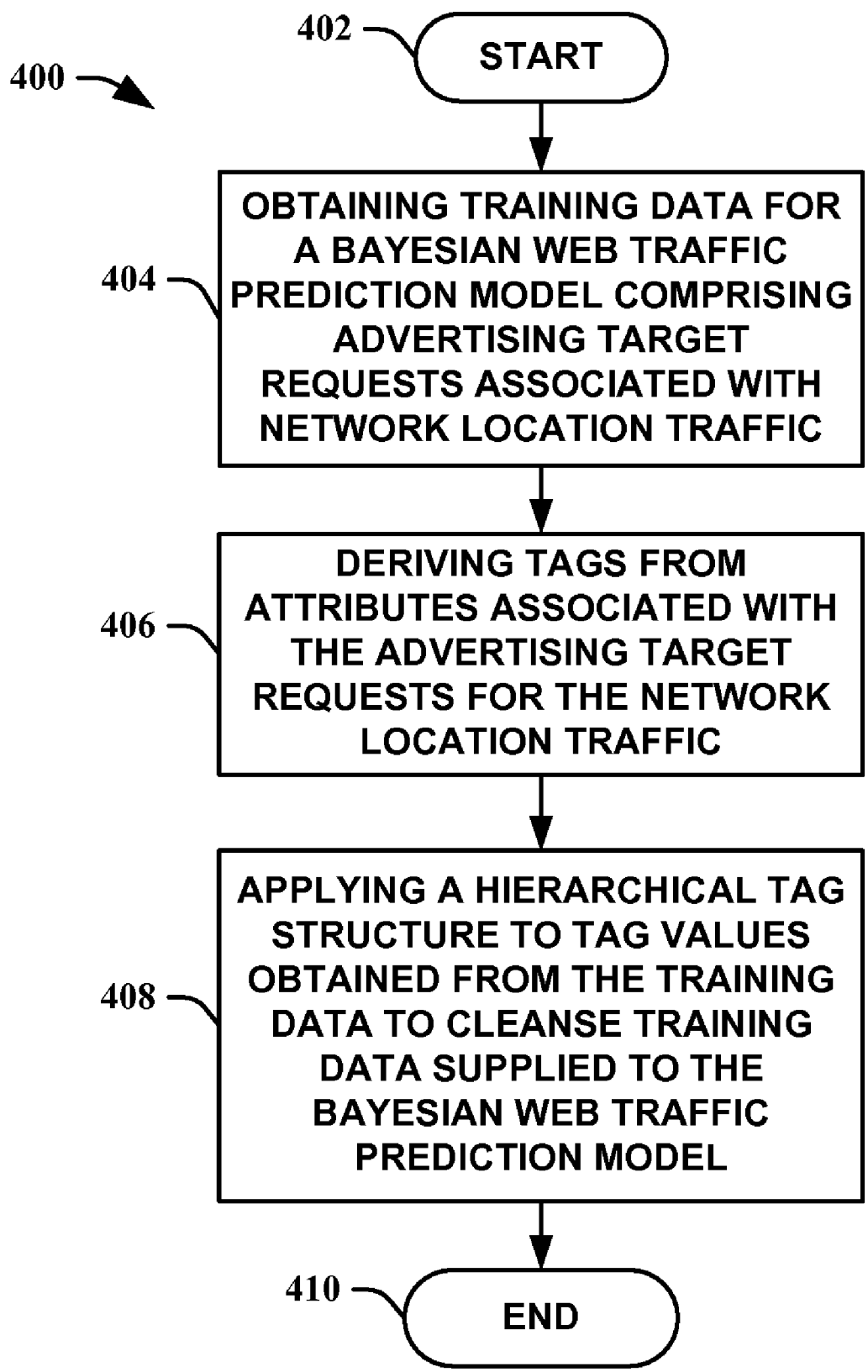
FIG. 4 is a flow diagram of a method of employing tag hierarchies to cleanse training data for a Bayesian web traffic prediction model in accordance with an aspect of an embodiment.

Referring to FIG. 4, a flow diagram of a method 400 of employing tag hierarchies to cleanse training data for Bayesian web traffic prediction model in accordance with an aspect of an embodiment is shown. This allows invalid relationships to be removed from data before it can improperly influence traffic predictions. Bad data can come from many sources such as, for example, users who hurriedly enter information into a website and/or where users intentionally provide disinformation to conceal their identity. The method 400 starts 402 by obtaining training data for a Bayesian web traffic prediction model comprising advertising target requests associated with network location traffic 404. Tags are then derived from attributes associated with the advertising target requests for the network location traffic 406. A hierarchical tag structure is then applied to tag values obtained from the training data to cleanse training data supplied to the Bayesian web traffic prediction model 408, ending the flow 410. Known hierarchies (such as which regions/states belong to which countries) are thus used to salvage as much data as possible from the training data while removing illogical combinations. This leads to cleaner models that are more accurate. TABLE 3, below, is an example hierarchy.

TABLE 3

Example Tag Hierarchy

COUNTRY = US
   STATE = Washington
      DMA = Seattle
      DMA = Spokane
   STATE = Ohio
      DMA = Cleveland
   STATE = California
      DMA = Fresno
   STATE = Florida
      DMA = Tampa
COUNTRY = CA
   STATE = Quebec
      DMA = Montreal In this hierarchy COUNTRY is a parent tag for STATE and an ancestor tag for STATE and DMA. Ohio is a parent tag value for Cleveland and US is an ancestor tag for Cleveland. A similar example can be constructed for the automobile industry. Each manufacturer has a make, model, and year. This hierarchy can be utilized to eliminate Ford Camaros and Chevrolet Mustangs. Likewise, 1975 Dodge Viper's can be culled as well to enhance the prediction models. Thus, almost anywhere a hierarchical relationship exists, it can be exploited to remove invalid combinations from the prediction model.

Figure 5:
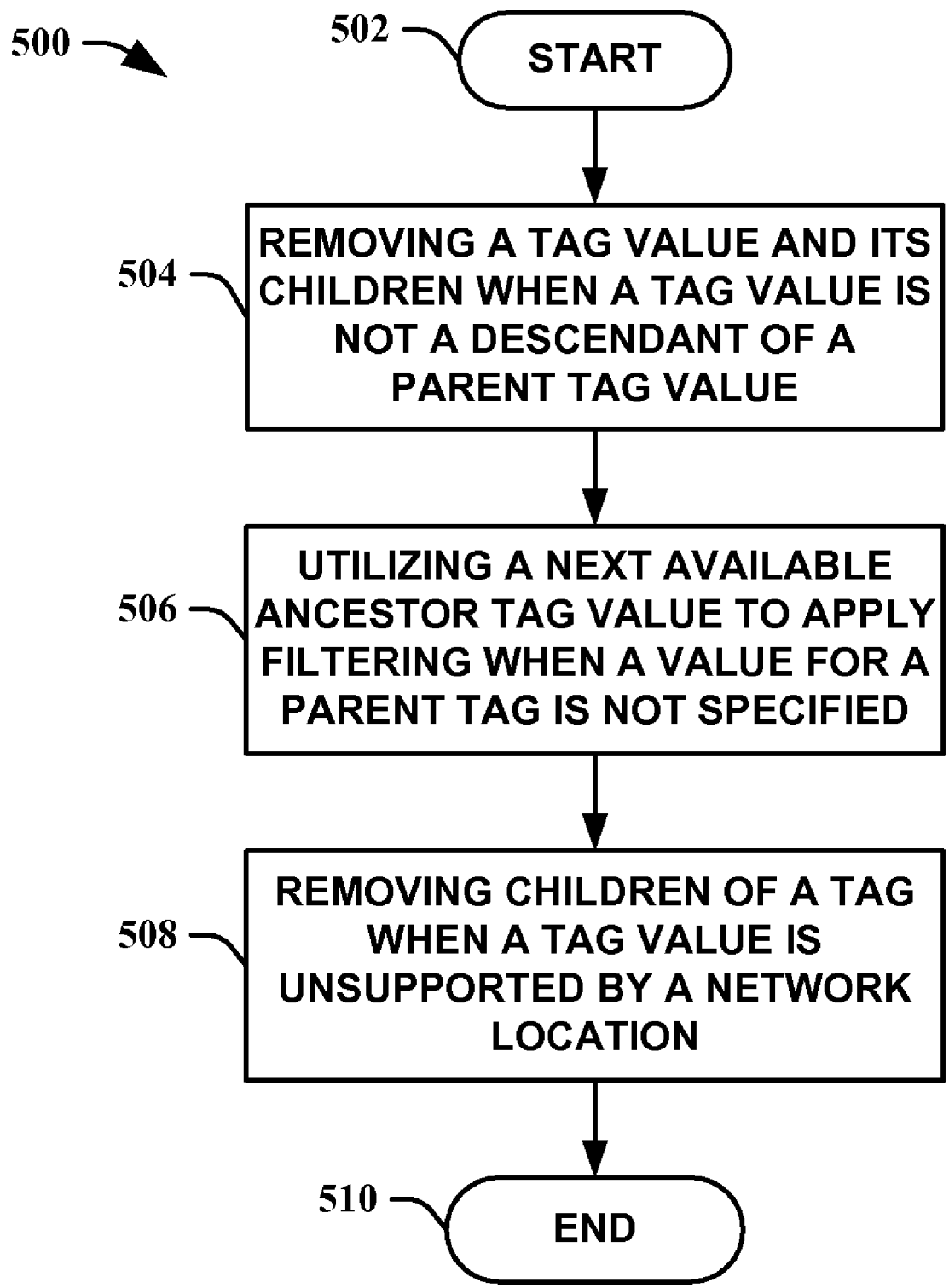
FIG. 5 is a flow diagram of a method of applying tag hierarchy restrictions to cleanse training data for a Bayesian web traffic prediction model in accordance with an aspect of an embodiment.

Looking at FIG. 5, a flow diagram of a method 500 of applying tag hierarchy restrictions to cleanse training data for Bayesian web traffic prediction model in accordance with an aspect of an embodiment is depicted. The method 500 starts 502 by removing a tag value and its children when a tag value is not a descendant of a parent tag value 504. A next available ancestor tag value is then utilized to apply filtering when a value for a parent tag is not specified 506. Children of a tag are then removed when a tag value is unsupported by a network location 508, ending the flow 510. This method 500 can be applied on each row of the training data. TABLE 4, below, illustrates some example filtering based on the example hierarchy provided supra.

Thus, instead of building a brand new model for each time period and discarding all previous data, existing models can be enhanced with new training data whenever possible. For example, if for week one a coin is tossed five times with two heads and three tails, the probability is ⅖'s that the coin will produce a head on the next toss. If during week two, the variables remain the same (e.g., heads and tail inputs), data from week two can be added to the prior week's data. Suppose during week 2, the coin toss resulted in 5 heads and 12 tails. This data can be added to the prior week's data of two heads and three tails to give 7 heads and 15 tails (with equal weighting across the samples) without altering the prediction model (i.e., without adding any additional variables to the domain) and adjusting the probability accordingly. It can be appreciated that other methods of incorporation can be utilized, including non-equal weighting across samples, and are within the scope of the methods disclosed herein.

Figure 7:
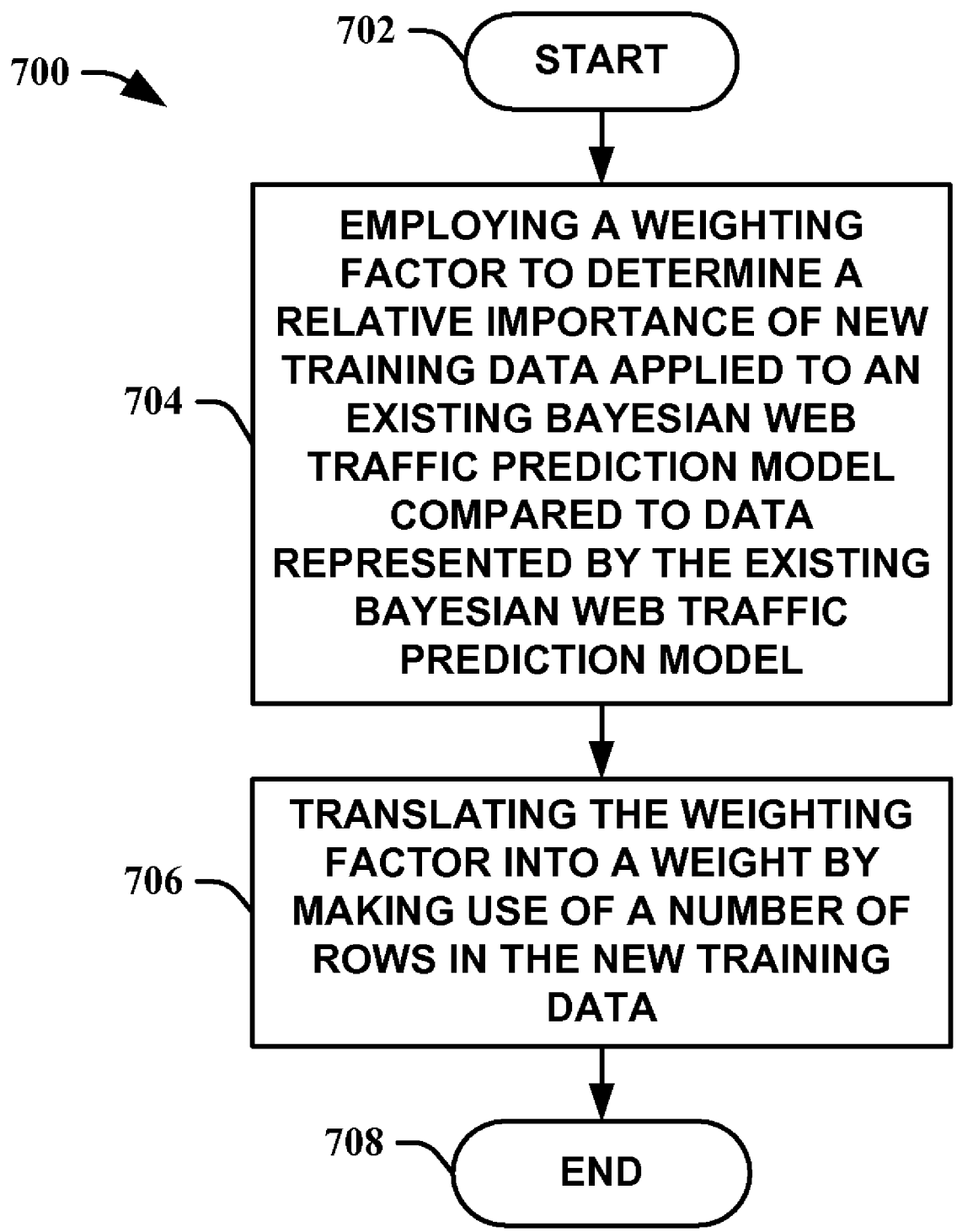
FIG. 7 is a flow diagram of a method of augmenting an existing Bayesian web traffic prediction model with weighted training data in accordance with an aspect of an embodiment.

Turning to FIG. 7, a flow diagram of a method 700 of augmenting an existing Bayesian web traffic prediction

TABLE 4

Hierarchy Filtering Example

| # | Input Training Data | Filtered Training Data | Explanation |
|---|---|---|---|
| 1 | COUNTRY = US<br>STATE = Washington<br>DMA = Seattle | COUNTRY = US<br>STATE = Washington<br>DMA = Seattle | No filtering is applied because the DMA value is a child of the STATE value which is a child of the COUNTRY value |
| 2 | COUNTRY = US<br>STATE = Ohio<br>DMA = Seattle | COUNTRY = US<br>STATE = Ohio | DMA is filtered because the specified value is not a child of the STATE value |
| 3 | COUNTRY = CA<br>STATE = California<br>DMA = Fresno | COUNTRY = CA | STATE and DMA are filtered because although the DMA value is a child of the STATE value, the STATE value is not a child of the COUNTRY value |
| 4 | COUNTRY = US<br>DMA = Tampa | COUNTRY = US<br>DMA = Tampa | No filtering is applied because although STATE is not specified, the DMA value is a child of a STATE value that is a child of the COUNTRY value |
| 5 | COUNTRY = CA<br>DMA = Tampa | COUNTRY = CA | DMA is filtered because although STATE is not specified, the DMA value is a child of a STATE value that is NOT a child of the specified COUNTRY value |
| 6 | COUNTRY = KR<br>DMA = Tokyo | COUNTRY = KR<br>DMA = Tokyo | The DMA value is not part of the hierarchy so no filtering is applied. |
| 7 | COUNTRY = KR<br>DMA = Portland | COUNTRY = KR<br>DMA = Portland | No filtering is applied because no parent tag value is specified for the DMA value. |

In general, information that is not controlled by a specified hierarchy is left alone. This allows future predictions based on a different hierarchy to readily utilize the information. If the information had been discarded, this would not be possible. Thus, only known incorrect or hazardous data is typically removed to increase the accuracy of the model. This eliminates false data that can influence the traffic predictions.

Figure 6:
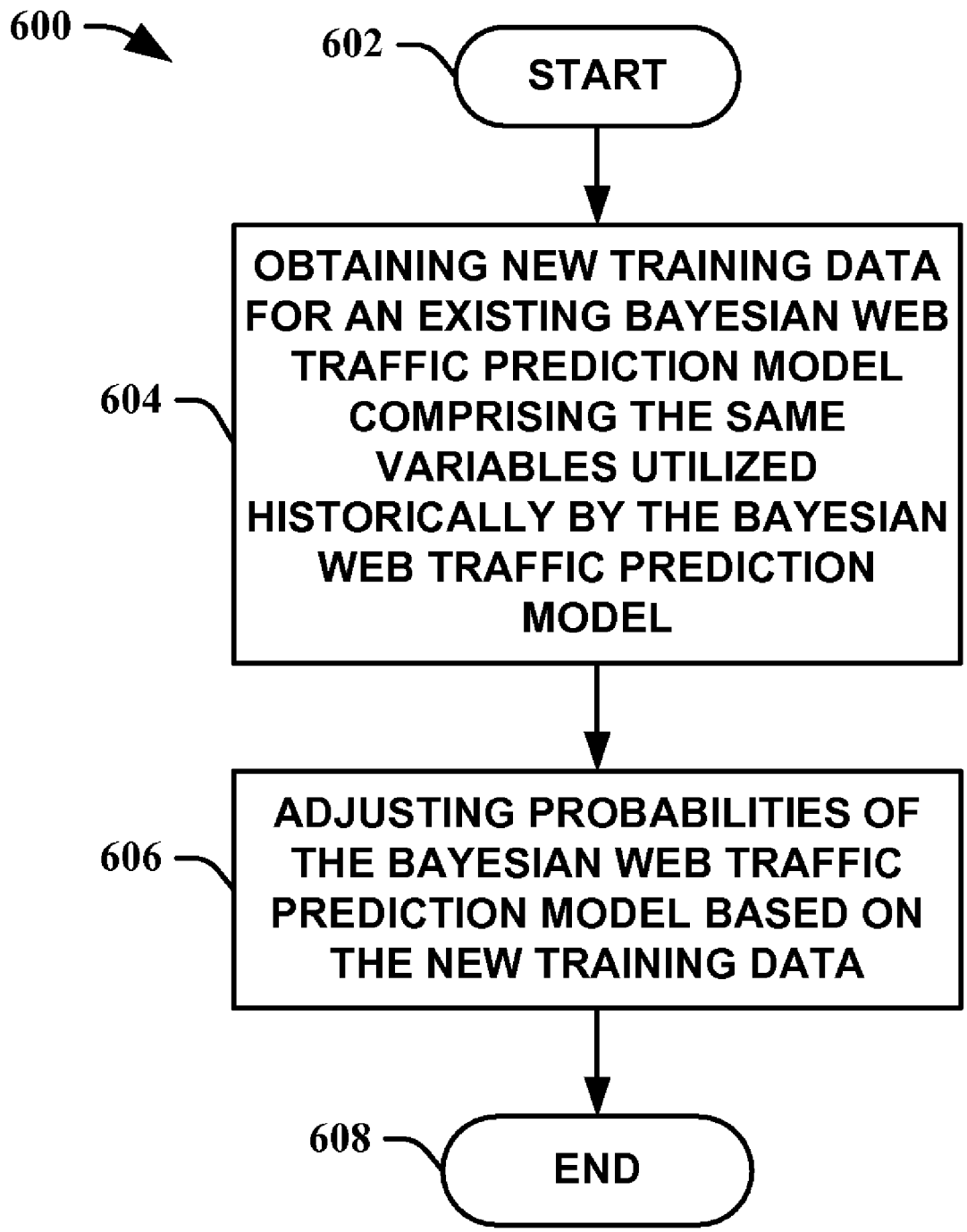
FIG. 6 is a flow diagram of a method of augmenting an existing Bayesian web traffic prediction model with new training data in accordance with an aspect of an embodiment.

In FIG. 6, a flow diagram of a method 600 of augmenting an existing Bayesian web traffic prediction model with new training data in accordance with an aspect of an embodiment is illustrated. This allows retention of an existing prediction model and its edge dependencies while updating the probability distribution. No re-learning of dependencies between tags and/or preferred edges is necessary. The method 600 starts 602 by obtaining new training data for an existing Bayesian web traffic prediction model comprising the same variables utilized historically by the Bayesian web traffic prediction model 604. Probabilities of the Bayesian web traffic prediction model are then adjusted based on the new training data 606, ending the flow 608.

model with weighted training data in accordance with an aspect of an embodiment is shown. The method 700 starts 702 by employing a weighting factor to determine a relative importance of new training data applied to an existing Bayesian web traffic prediction model compared to data represented by the existing Bayesian web traffic prediction model 704. The weighting factor is then translated into a weight by making use of a number of rows in the new training data 706, ending the flow 708. More recent data is weighted more than older data to give a sliding window of data across time that the model represents.

Thus, a model can be enhanced instead of constructed if it needs to support substantially the same tags, tag values, and/or parameters as it previously did. In this case, the new training data is used to adjust the probabilities in the Bayesian model. A weighting factor can then be used to determine the relative importance of the new training data in the new model compared to the data represented by the existing model. A substantially small weighting factor for new training data allows existing data to have a stronger influence and a model will take longer to adapt to the new training data. On the other hand, a substantially large weighting factor for the new training data makes it much stronger over the existing data and the model will quickly adapt to the new training data. The weighting factor can then be translated into a weight by making use of the number of rows in the new training data. Weighting, however, is not required.

Figure 8:
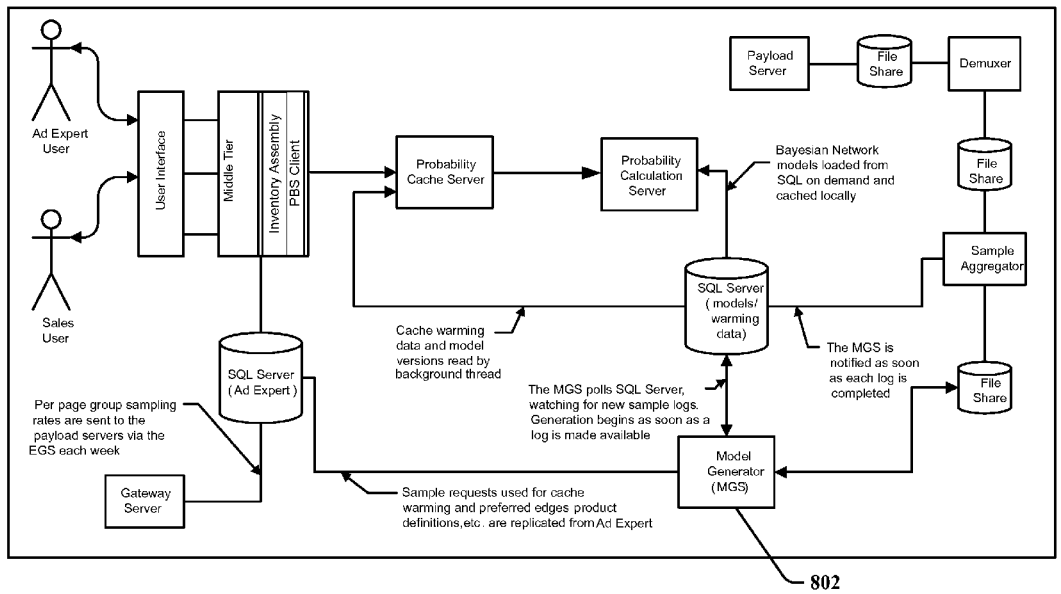
FIG. 8 illustrates an example advertising system architecture that can employ a Bayesian web traffic prediction model with probability enhancements in accordance with an aspect of an embodiment.

In FIG. 8, an example advertising system architecture 800 that can employ a Bayesian web traffic prediction model with probability enhancements in accordance with an aspect of an embodiment is depicted. A model generator 802 can utilize a Bayesian model for predicting web traffic for a network location. This Bayesian model can employ one or a combination of the probability enhancement methods 200-700 described supra. This allows an advertising system to substantially increase the accuracy of their traffic predictions and, thus, increase their advertising revenues based on those predictions. Portions of the advertising system architecture 800 can reside in disparate locations. Likewise, aspects of the methods 200-700 provided herein can be accomplished in disparate locations as well.

Figure 9:
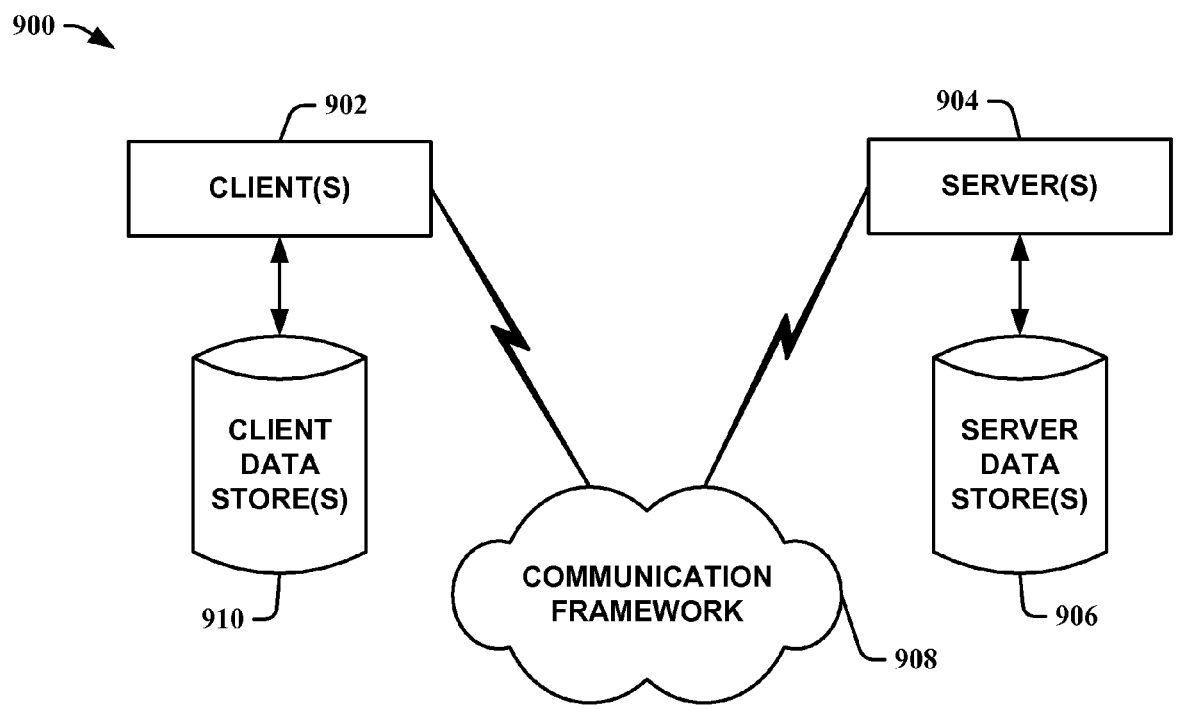
FIG. 9 illustrates an example operating environment in which an embodiment can function.

FIG. 9 is a block diagram of a sample computing environment 900 with which embodiments can interact. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). One possible communication between a client 902 and a server 904 can be in the form of a data packet adapted to be transmitted between two or more computer processes. The system 900 includes a communication framework 908 that can be employed to facilitate communications between the client(s) 902 and the server(s) 904. The client(s) 902 are connected to one or more client data store(s) 910 that can be employed to store information local to the client(s) 902. Similarly, the server(s) 904 are connected to one or more server data store(s) 906 that can be employed to store information local to the server(s) 904.

It is to be appreciated that the systems and/or methods of the embodiments can be utilized in web traffic prediction facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for enhancing Bayesian probability accuracy for web traffic prediction models, comprising using one or more computing devices to perform the following computer-executable acts:

obtaining advertising target requests for web traffic associated with a network location;

extracting attribute pairs from the advertising target requests;

utilizing the attribute pairs to create preferred edges for tuning a Bayesian web traffic prediction model for facilitating web traffic prediction;

determining a preferred edge importance, for two or more preferred edges, based on the number of advertising target requests associated with the attribute pairs of the preferred edges;

sorting the preferred edges into a preferred edge list, sorting the preferred edges by increasing importance based on the determined preferred edge importance associated with each preferred edge; and tuning the Bayesian web traffic prediction model using the preferred edge list.

2. The method of claim 1 further comprising:

employing a combination of probability enhancement methods including the derived preferred edges based on attribute pairs and a probability enhancement method based on explicitly specified preferred edges received from a user or a system or a user and a system in order to increase the accuracy of the Bayesian web traffic prediction model.

3. method of claim 1, wherein the attribute pairs are non-directional.

4. The method of claim 1, wherein the attribute pairs comprise, at least in part, gender and age pairs and/or gender and location pairs.

5. An advertising revenue system that employs the method of claim 1.

6. A method for enhancing Bayesian probability accuracy for web traffic prediction models, comprising using one or more computing devices to perform the following computer-executable acts:

obtaining training data for a Bayesian web traffic prediction model, the training data comprising advertising target requests associated with network location traffic;

deriving tag values from attributes associated with the advertising target requests for the network location traffic; and applying a hierarchical tag structure to the tag values, where a hierarchal relationship exists between two or more tag values, to cleanse the training data of an invalid relationship between attributes associated with one or more of the advertising target requests, wherein the invalid relationships are removed from the training data supplied to the Bayesian web traffic prediction model to improve the accuracy of the Bayesian web traffic prediction model.

7. The method of claim 6 further comprising:

cleansing the training data utilizing parent-child relationships, ancestor relationships, and/or network location specific parameters.

8. The method of claim 6 further comprising:

employing tag value hierarchies to separate the training data into rows.

9. The method of claim 8, wherein employing tag value hierarchies comprises:

removing a tag value and its children when a tag value is not a valid descendant of a parent tag value associated with the tag value;

utilizing a next available ancestor tag value to apply filtering when a value for a parent tag is not specified; and removing children of a tag when a tag value is unsupported by the network location.

10. The method of claim 9, wherein removing non-descendent tag values and its children is performed regardless of whether the parent tag and tag value are supported by the network location.

11. The method of claim 9, wherein a hierarchical tag structure comprises country as a parent tag, state as a child tag of country, and city as a child tag of state.

12. An advertising system that employs the method of claim 6 to facilitate advertising revenue generation.

13. A method for enhancing Bayesian probability accuracy for web traffic prediction models, comprising using one or more computing devices to perform the following computer-executable acts:
obtaining new training data for an existing Bayesian web traffic prediction model to update the probability distribution of the existing Bayesian web traffic prediction model, the new training data comprising the same variables utilized historically by the Bayesian web traffic prediction model;
adjusting probabilities of the Bayesian web traffic prediction model based on the new training data and dependencies between one or more tags and preferred edges of the existing Bayesian traffic prediction model; and
implementing user advertising target queries to determine improved preferred edges of the Bayesian web traffic prediction model and tag hierarchies to cleanse training data for the Bayesian web traffic prediction model to further enhance prediction accuracy of the Bayesian web traffic prediction model.

14. The method of claim 13 further comprising:
employing a weighting factor to determine a relative importance of the new training data applied to the existing Bayesian web traffic prediction model compared to data represented by the existing Bayesian web traffic prediction model.

15. The method of claim 13 further comprising: translating the weighting factor into a weight by making use of a number of rows in the new training data.

16. The method of claim 15 further comprising:
utilizing the new training data to adjust probabilities in the existing Bayesian web traffic prediction model by weighting the new training data differently than data represented by the existing Bayesian web traffic prediction model.

17. An advertising revenue system that employs the method of claim 13.

18. A method for enhancing Bayesian probability accuracy for web traffic prediction models, comprising using one or more computing devices to perform the following computer-executable acts:
forming a Bayesian web traffic prediction model using statistics about web traffic;
extracting, from advertiser queries seeking information about advertising targets, attribute pairs relating to the advertising targets;
utilizing a combination of probability enhancement methods for tuning the Bayesian web traffic prediction model including preferred edges derived from the attribute pairs and explicitly specified preferred edges received from a user or system;
sorting the extracted attribute pairs in order of frequency of occurrence; and
using the sorted attribute pairs to bias dependencies in the Bayesian web traffic prediction model, for prediction that takes into account the advertiser queries.

19. The method of claim 18 further comprising:
biasing the dependencies in the Bayesian web traffic prediction model based on how recently each attribute pair was extracted from the advertiser queries.

* * * * *